(12) United States Patent
Zhu et al.

(10) Patent No.: US 7,487,671 B1
(45) Date of Patent: Feb. 10, 2009

(54) TIRE PARAMETER MONITORING SYSTEM WITH SENSOR LOCATION USING MAGNETIC FIELDS

(75) Inventors: Shengbo Zhu, San Jose, CA (US); Su Shiong Huarg, Bellevue, WA (US)

(73) Assignee: Silicon Valley Micro C Corp., San Jose, CA (US)

( * ) Notice: Subject to any disclaimer, the term of this patent is extended or adjusted under 35 U.S.C. 154(b) by 0 days.

(21) Appl. No.: 11/893,803

(22) Filed: Aug. 18, 2007

(51) Int. Cl.
*B60C 23/02* (2006.01)

(52) U.S. Cl. ............................ 73/146.5; 340/447
(58) Field of Classification Search ............. 73/146.5; 340/447, 448
See application file for complete search history.

(56) References Cited

U.S. PATENT DOCUMENTS

| | | | |
|---|---|---|---|
| 6,591,671 B2 * | 7/2003 | Brown | 73/146.5 |
| 6,691,567 B2 * | 2/2004 | Walker et al. | 73/146 |
| 6,725,712 B1 * | 2/2004 | King et al. | 73/146.5 |
| 6,788,193 B2 * | 9/2004 | King et al. | 340/447 |
| 6,838,985 B2 * | 1/2005 | Ghabra et al. | 340/445 |
| 6,904,796 B2 * | 6/2005 | Pacsai et al. | 73/146.8 |
| 6,967,571 B2 * | 11/2005 | Tsujita | 340/447 |
| 7,019,630 B2 * | 3/2006 | Katou | 340/448 |

* cited by examiner

*Primary Examiner*—Andre J Allen

(57) ABSTRACT

A tire parameter monitoring system has a plurality of sensor units each mounted with a different vehicle tire. Each sensor unit has a magnetic sensing element for converting magnetic field signals generated by a proximate set of magnets mounted to the vehicle at the tire locations. Each magnet set generates a unique magnetic field which identifies the magnet set location. Each sensor unit has a microcontroller for combining the converted magnetic field signals with fire parameter signals, and a transmitter for transmitting the combined signals to a receiving location. Received tire parameter signals are correlated with the tire location using the location signals, and driver advisory signals are presented to the driver.

15 Claims, 7 Drawing Sheets

TIRE PARAMETER MONITORING SYSTEM WITH SENSOR LOCATION USING MAGNETIC FIELDS

BACKGROUND OF THE INVENTION

This invention relates to vehicle tire parameter monitoring systems. More particularly, this invention relates to a fire parameter monitoring system having a sensor unit position location feature using permanent magnets.

Tire parameter monitoring systems are known and are commonly used to monitor one or more parameters of interest in individual pneumatic tires of a vehicle and to provide an advisory signal to the driver, usually via an on-board computer system, containing information about the fire parameter(s). The portion of the fire parameter monitoring system located at or in the individual fires is termed the sensor unit, and is coupled to one or more sensors capable of measuring the parameter(s) of interest and generating an electrical signal representative of the value of the measurement, a signal generator (typically an r.f. signal generator) capable of generating a wireless signal corresponding to the electrical signal, a microcontroller (such as a microprocessor or a digital signal processor) and a power source. Electrical power to the sensor circuitry is usually provided by a battery, which must be replaced (if possible) when the available battery power drops below a useful level. In some known systems, the battery cannot be replaced so that the entire sensor assembly must be replaced when the battery has reached the end of its useful lifetime. A tire parameter sensor system which monitors internal tire pressure is disclosed in commonly assigned, U.S. Pat. No. 6,959,594 issued Nov. 1, 2005 for "External Mount Tire Pressure Sensor System", the disclosure of which is hereby incorporated by reference. A tire pressure monitoring system which incorporates a power saving unit providing extended useful battery life is disclosed in commonly assigned, U.S. Pat. No. 7,222,523 issued May 29, 2007 for "Tire Pressure Sensor System With Improved Sensitivity And Power Saving", the disclosure of which is hereby incorporated by reference. A tire parameter monitoring system which eliminates the usual battery is disclosed in commonly-assigned, co-pending patent application Ser. No. 11/473,278 filed Jun. 22, 2006 for "Tire Parameter Monitoring System With Inductive Power Source" (the '278 application), the disclosure of which is hereby incorporated by reference.

The advisory signal produced by the sensor unit may indicate (a) whether a given parameter in the associated vehicle tire has a current value lying within or outside of a predetermined safe range, (b) the measured value of the parameter, or (c) some other fire parameter information of interest. Examples of common tire parameters are internal tire pressure, tire temperature, internal tire air temperature, and lateral tire force. In some cases, the parameter may be related to the condition of the wheel on which the tire is mounted, such as the angular moment of the wheel, concentricity or the like.

The advisory signal is typically generated by the r.f. signal generator controlled by the microprocessor connected to the tire parameter sensor, the advisory signal being generated in accordance with the system design characteristics: i.e., whether the system uses the range indicator value (in range/outside range), the measured value, or the other information of interest. This r.f. signal is transmitted to a vehicle-mounted receiver, which uses the advisory signal to alert the driver either visually (by activating a warning lamp or display) or audibly (by activating an audible alarm) or both. Alternatively, or in addition, the receiver may use the advisory signal for some other system purpose, such as to activate a vehicle control system, such as braking control, suspension control, and the like; to store the parameter data for future analysis; or for any other desired purpose.

In order to provide an operable system, it is necessary to correlate the advisory signals received by the vehicle-mounted receiver with the physical location on the vehicle of the tire whose parameter condition is specified by a given advisory signal. In the past, various techniques have been devised for this purpose. A common technique is the inclusion of an identification signal along with the parameter condition in a given advisory signal: the identification signal is unique to the sensor unit which generates the parameter condition. This unique identification signal is initially correlated to tire location on the vehicle by a technician having the required skill and training to operate the system in an initial training mode. Once each sensor unit has been initially correlated to its physical location on the vehicle, any advisory signal generated by a given sensor unit and received by the vehicle-mounted receiver can be uniquely identified with the location of the tire whose parameter condition is specified by the advisory signal.

A disadvantage with this type of location correlation technique is that any change to the original tire and sensor unit location requires that the system be re-correlated. For example, if the vehicle tires are relocated to different positions in the normal course of vehicle servicing, the physical locations of the sensor units will change if the sensor units are fixed to the tires or the wheels on which the tires are mounted (which is typical), and each individual sensor unit must be re-correlated to the physical location of the associated tire. The same is true (a) when a spare tire is exchanged for a flat tire on the vehicle; (b) when one or more new tires are installed on the vehicle wheels and mounted on the vehicle; and (c) when a new sensor unit is installed in place of a unit which stops functioning property. As noted above, re-correlation requires the efforts of someone having the required skill and training to operate the system in a training mode. While some vehicle owners may be capable of acquiring the necessary skill and training, others may not. The latter will necessarily suffer delay and expense when re-configuring the vehicle tires and wheels; the former will suffer at least the delay attendant upon re-familiarizing oneself with the steps required to re-program an electronic system.

A variation of this type of sensor unit correlation system uses a manually actuatable transmitter installed in the valve stem of a tire. The transmitter is actuated by inserting a small object into the valve stem a sufficient axial distance to operate a switch, which causes the transmitter to send an appropriate signal to a vehicle-mounted receiver capable of correlating the signal from the operating transmitter to the tire to which the transmitter is attached. An example of this type of system is disclosed in U.S. Pat. No. 6,998,975 B2 issued Feb. 14, 2006, the disclosure of which is hereby incorporated by reference. This system requires some provision for ensuring that any change to the original sensor unit/tire location configuration will cause a re-correlation of the sensor units with the new configuration.

Another common technique used to correlate the advisory signals received by the vehicle-mounted receiver with the physical location on the vehicle of the tire whose parameter condition is specified by a given advisory signal incorporates a special multiple antenna interrogator system connected to a vehicle-mounted controller and a complementary set of sensor units. Each antenna is connected to the controller in such a way that only one antenna is actively coupled to the controller during any given interrogation interval. Each antenna is located adjacent a different associated one of the sensor units in sufficiently close proximity that an interrogation signal generated by a given antenna is operatively coupled essentially only to the associated sensor unit. Each sensor unit has a circuit responsive to an interrogation signal from the associated antenna to initiate a parameter signal transmission sequence during which the value measured by a sensor is transmitted to a receiver located in the vehicle-mounted controller, where it is processed. Since the location of each individual interrogation antenna is fixed, it can be permanently correlated to a wheel location. Therefore, when the controller activates a given interrogation antenna, the subsequently received parameter signal is automatically correlated with the correct tire location. Examples of this type of unit are disclosed in U.S. Patent Application Publication No. US 2003/0145650 A1 published Aug. 7, 2003; and U.S. Pat. No. 6,838,985 B2, the disclosures of which are hereby incorporated by reference.

A disadvantage to the interrogator antenna system described above lies in the requirement for the installation of the separate interrogation antennae adjacent the tire parameter sensor units. The necessary electrical cabling must be routed between the controller and the individual antennae. This imposes a requirement of careful routing of the cables to avoid mechanical abrasion, electrical interference, and thermal stresses over time. As a consequence, installation cost and hardware durability are factors of concern when deciding to implement such a system.

Efforts to provide a simple, inexpensive, reliable, and accurate sensor unit location feature for a tire parameter sensing system devoid of the above-noted disadvantages have not been successful to date.

SUMMARY OF THE INVENTION

The invention comprises a method and system for providing sensor unit location information which is simple and inexpensive to implement, highly reliable, and accurate.

In a first apparatus aspect, the invention comprises a sensor unit for use with a vehicle mounted tire parameter monitoring system having at least one tire parameter sensor, the sensor unit including a magnetic sensing element for generating location signals from magnetic fields encountered by the magnetic sensing element; a microcontroller coupled to the magnetic sensing element for receiving and processing the location signals and tire parameter signals from an associated tire parameter sensor; and a signal generator controlled by the microcontroller for transmitting the processed location signals and the tire parameter signals to a receiving location. The magnetic sensing element of the sensor unit preferably comprises an inductive coil having an output coupled to an input of the microcontroller.

The sensor unit further preferably includes an analog-to-digital converter having an input coupled to the magnetic sensing element and an output coupled to the microcontroller for converting the analog location signals to digital form.

The sensor unit further includes one or more tire parameter sensors each having an output coupled to the microcontroller for supplying current values of the monitored tire parameters for processing by the microcontroller.

In a second apparatus aspect, the invention comprises a tire parameter monitoring system for monitoring the current values of tire parameters of tires mounted on a vehicle, the system comprising a plurality of sensor units each associated to a different tire on the vehicle, each sensor unit including a magnetic sensing element for generating location signals from magnetic fields encountered by the magnetic sensing element; a microcontroller coupled to the magnetic sensing element for receiving and processing the location signals and tire parameter signals from an associated tire parameter sensor; and a signal generator controlled by the microcontroller for transmitting the processed location signals and the tire parameter signals to a receiving location; and a plurality of sets of magnets for generating a plurality of different magnetic field signals, each set of magnets being located in proximity to a different one of the plurality of sensor units in a location at which the magnetic field generated thereby is encountered by the corresponding sensor unit as the associated tire rotates. Each magnetic sensing element preferably comprises an inductive coil.

Each sensor unit preferably includes an analog-to-digital converter having an input coupled to the magnetic sensing element and an output coupled to the microcontroller for converting analog location signals to digital form.

Each said sensor unit further preferably includes one or more tire parameter sensors each having an output coupled to the microcontroller for supplying current values of the monitored tire parameters for processing by the microcontroller.

The system further includes a receiver processor for receiving and processing the location signals and tire parameter signals from the sensor units.

From a process standpoint, the invention comprises a method of correlating tire parameter signals generated by sensor units associated to different ones of a plurality of tires on a vehicle with the location of tires whose parameters are monitored by the sensor units, the method comprising the steps of:

(a) generating a plurality of different magnetic field signals in proximity to the sensor units, each different magnetic field signal being associated to a different tire location on the vehicle;

(b) converting each different magnetic field signal to an electric sensor unit location signal;

(c) combining each electric sensor unit location signal with the tire parameter signals from the sensor unit at the location specified by the electric sensor unit sensor signal, and (d) transmitting the signals combined in step (c) to a receiving location.

Step (a) of generating preferably includes the step of using a plurality of sets of permanent magnets, each set being located in proximity to a different tire.

Step (b) of converting preferably includes the steps of moving a magnetic sensing element located on a given sensor unit through the proximate magnetic field signal.

Each electric sensor unit location signal is preferably an analog signal; and step (b) of converting preferably includes the step of converting the analog signal to a digital signal.

The method further preferably includes the step (e) of processing the signals transmitted in step (d) at the receiving location, and the step (e) of processing preferably includes the step of generating a driver advisory signal for a given tire parameter.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
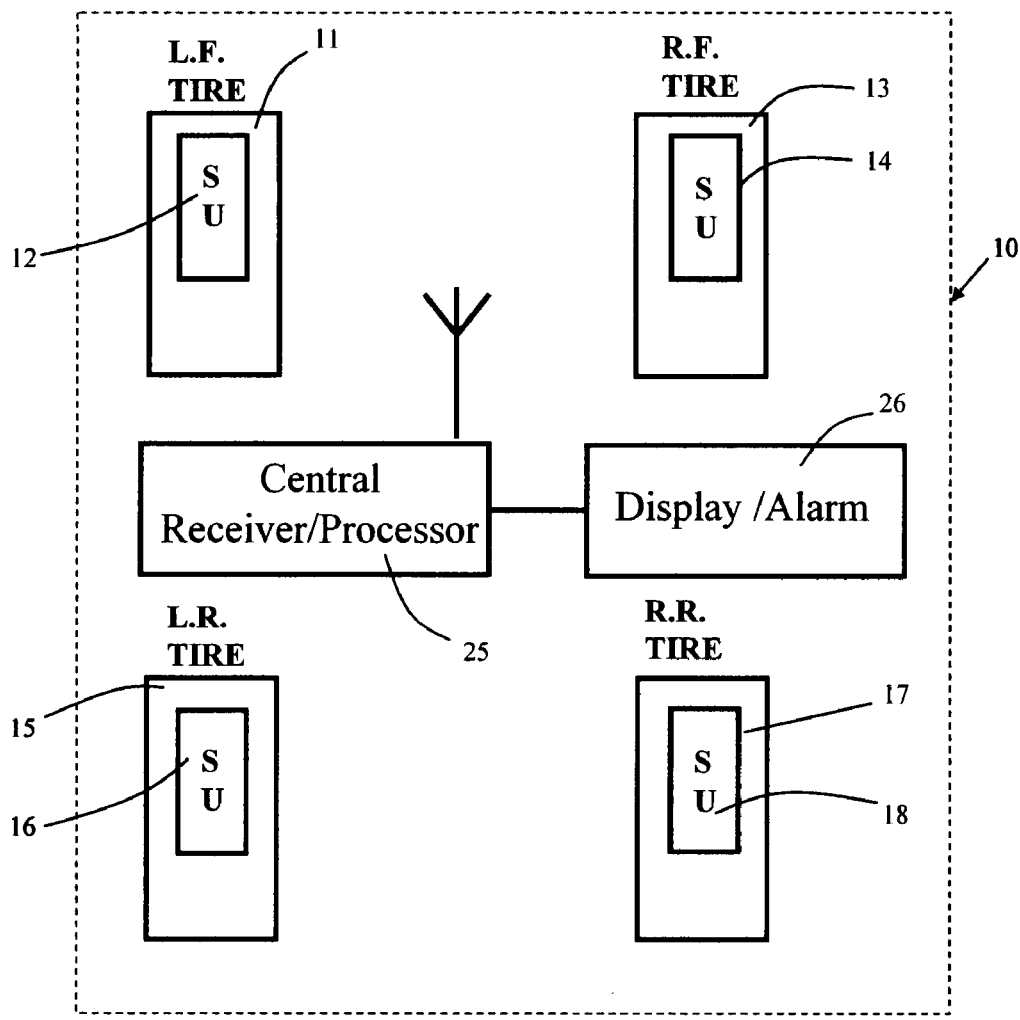
FIG. 1 is a schematic top plan view of a tire parameter sensing system incorporating the sensor unit location feature of the invention.
Figure 3:
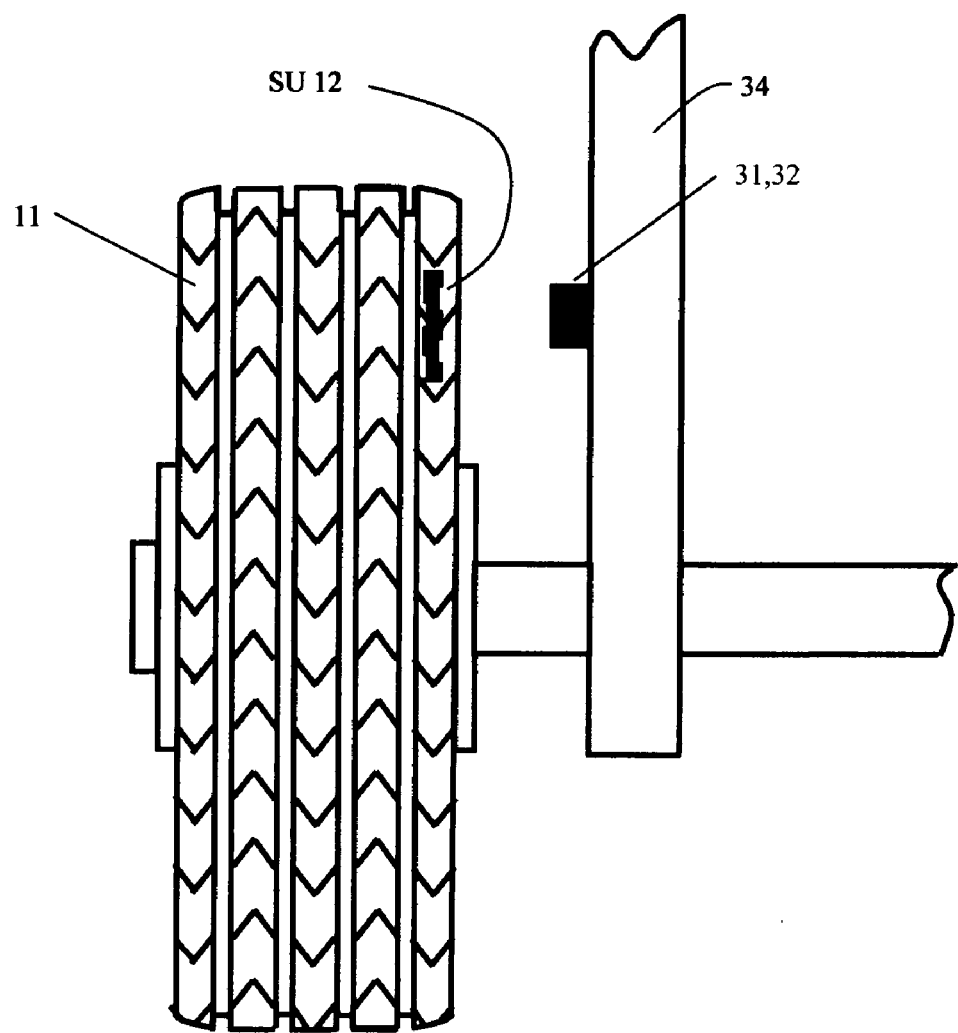
FIG. 3 is a schematic front view showing a tire and wheel mounted in operative relation to the magnet mounting arrangement of FIG. 2.
Figure 5:
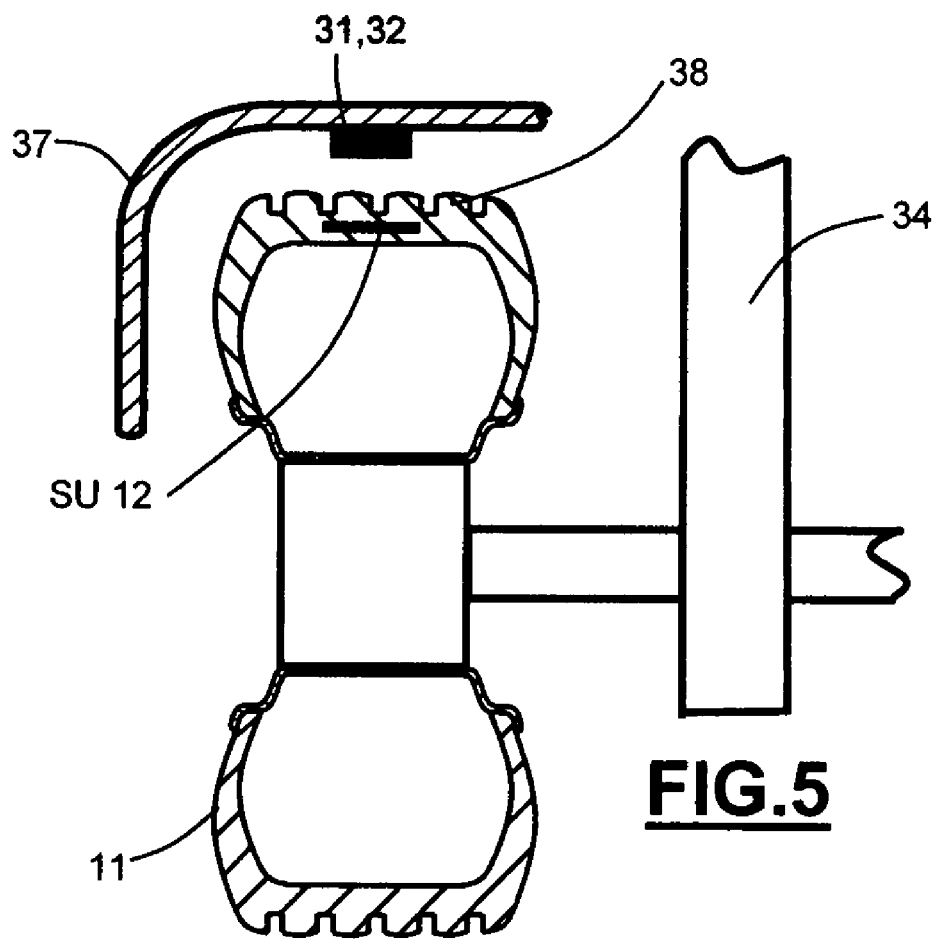
FIG. 5 is a schematic front partial sectional view showing a tire and wheel mounted in operative relation to the magnet mounting arrangement of FIG. 4.

Turning now to the drawings, FIG. 1 is a schematic top plan view of a tire parameter sensing system incorporating the sensor unit location feature of the invention. As seen in this Fig., which illustrates a vehicle having four tires and wheels, each tire has an associated tire parameter sensor unit SU. Thus, left front tire 11 is provided with SU 12; right front tire 13 is provided with SU 14; left rear tire 15 is provided with SU 16; and right rear tire 17 is provided with SU 18. As described more fully below in connection with FIG. 6, each SU 12, 14, 16, and 18 is connected to one or more tire parameter sensors for monitoring the state of individual tire parameters, such as internal tire pressure, tire temperature, internal tire air temperature, and lateral tire force. Such sensors are well known in the art and will not be described further to avoid prolixity. The physical location of the individual SUs 12, 14, 16, and 18 is a matter of design choice and may include the outer side wall of the associated tire, the inner side wall of the tire, within the tire carcass at an appropriate location (such as within the inner side wall of the tire as illustrated in FIG. 3 or within the tread wall of the tire as illustrated in FIG. 5), or on the wheel hub. Each SU 12, 14, 16, and 18 further incorporates a magnetic field sensing element for a purpose to be described. Each SU 12, 14, 16, and 18 also incorporates a microcontroller unit for processing sensor signals and magnetic field signals, and an r.f. transmitter unit for transmitting tire parameter advisory signals and magnetic field signals to a central receiver/processor 25. Central receiver/processor 25 uses the magnetic field signals to associate the tire parameter advisory signals with the correct tire, and converts the tire parameter advisory signals into driving signals for a display/alarm unit 26 of conventional design, in which the parameter states can be displayed for the user and in which audible alarm signals can be generated to alert the driver of a dangerous tire condition.

Figure 2:
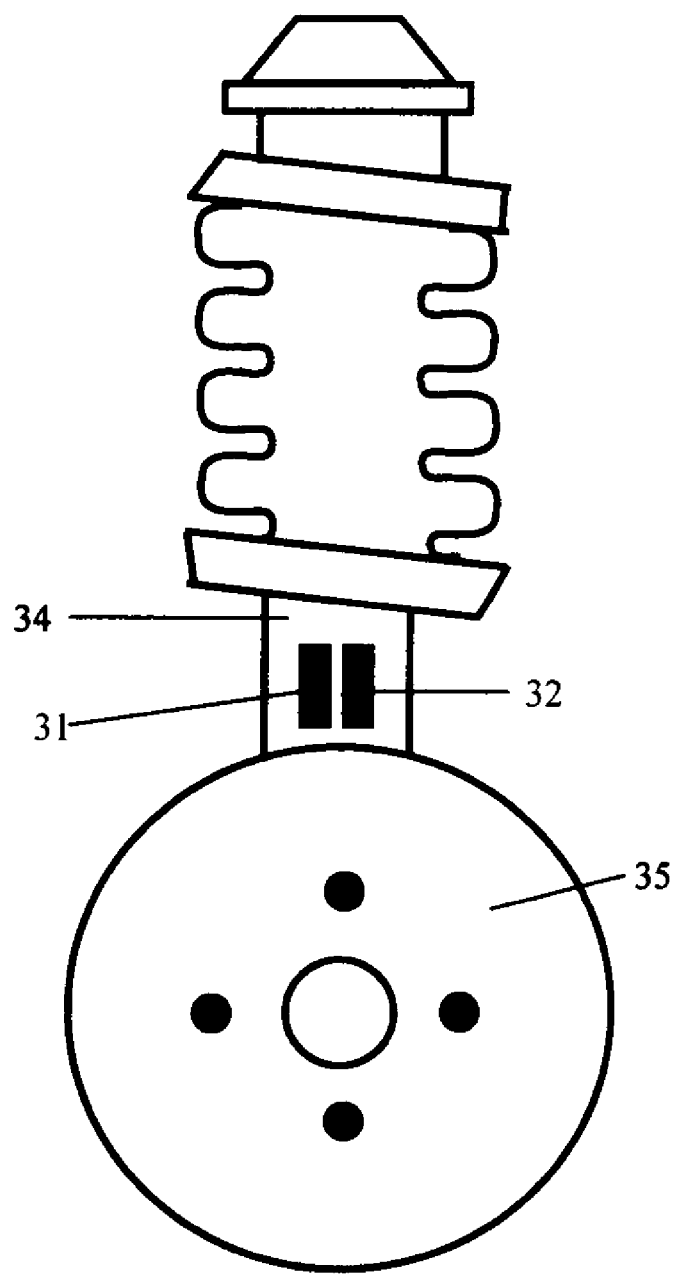
FIG. 2 is a schematic side view showing one magnet pair mounting arrangement according to the invention.

FIGS. 2 and 3 illustrate one magnet pair mounting arrangement used in conjunction with SUs 12, 14, 16, and 18 to provide sensor unit location signals according to the invention. FIG. 2 is a schematic side view showing the magnet pair mounting arrangement, while FIG. 3 is a schematic front view showing a tire and wheel mounted in operative relation to the magnet mounting arrangement of FIG. 2. With reference to FIG. 2, a pair of permanent magnets 31, 32 is secured to a suspension component 34 at a location adjacent a wheel mounting hub 35. Magnets 31, 32 are thus stationary with respect to the wheel and tire when the wheel and tire are rotating. The exact location of magnets 31, 32 is a function of the geometry of the wheel and tire and the location of the sensor unit. As seen in FIG. 3, which illustrates the left front tire 11 viewed from the rear and looking forward, for a sensor unit 12 mounted within the side wall of tire 11, magnets 31, 32 are mounted on suspension unit 34 in a location at which the combined magnetic fields will encounter the magnetic field sensing element incorporated into sensor unit 12. Thus, whenever tire 11 is rotating, sensor unit 12 will encounter the combined magnetic field from magnets 31, 32 once per tire revolution.

Figure 4:
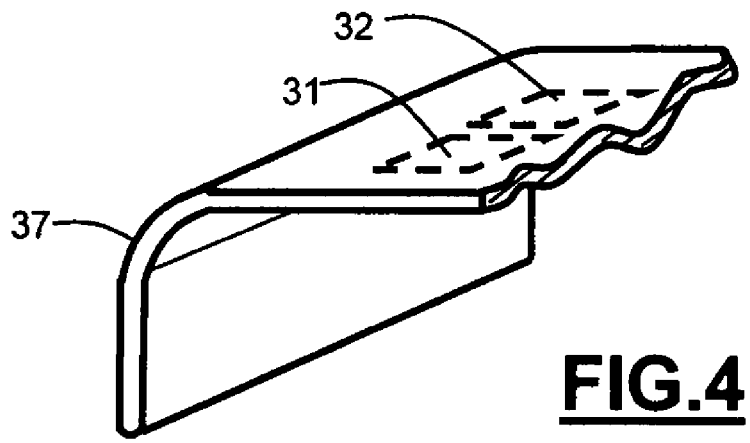
FIG. 4 is a schematic perspective view showing another magnet pair mounting arrangement according to the invention.

FIGS. 4 and 5 illustrate another magnet pair mounting arrangement used in conjunction with SUs 12, 14, 16, and 18 to provide sensor unit location signals according to the invention. This arrangement is used in those installations in which the sensor unit is mounted in the tread wall of the tire. FIG. 4 is a schematic perspective view showing this magnet pair mounting arrangement, while FIG. 5 is a schematic front view partially in section showing a tire and wheel mounted in operative relation to the magnet mounting arrangement of FIG. 4. With reference to FIG. 4, a pair of permanent magnets 31, 32 is secured to a mechanical component 37 (such as a fender) at a location adjacent the upper surface of the tire tread wall 38. Magnets 31, 32 are thus stationary with respect to the wheel and tire when the wheel and tire are rotating. The exact location of magnets 31, 32 is a function of the geometry of the wheel and tire and the location of the sensor unit. As seen in FIG. 5, which illustrates the left front tire 11 viewed from the rear and looking forward, for a sensor unit 12 mounted within the tread wall 38 of tire 11, magnets 31, 32 are mounted on mechanical component 37 at a location at which the combined magnetic fields will encounter the magnetic field sensing element incorporated into sensor unit 12. Thus, whenever tire 11 is rotating, sensor unit 12 will encounter the combined magnetic field from magnets 31, 32 once per tire revolution.

Figure 6:
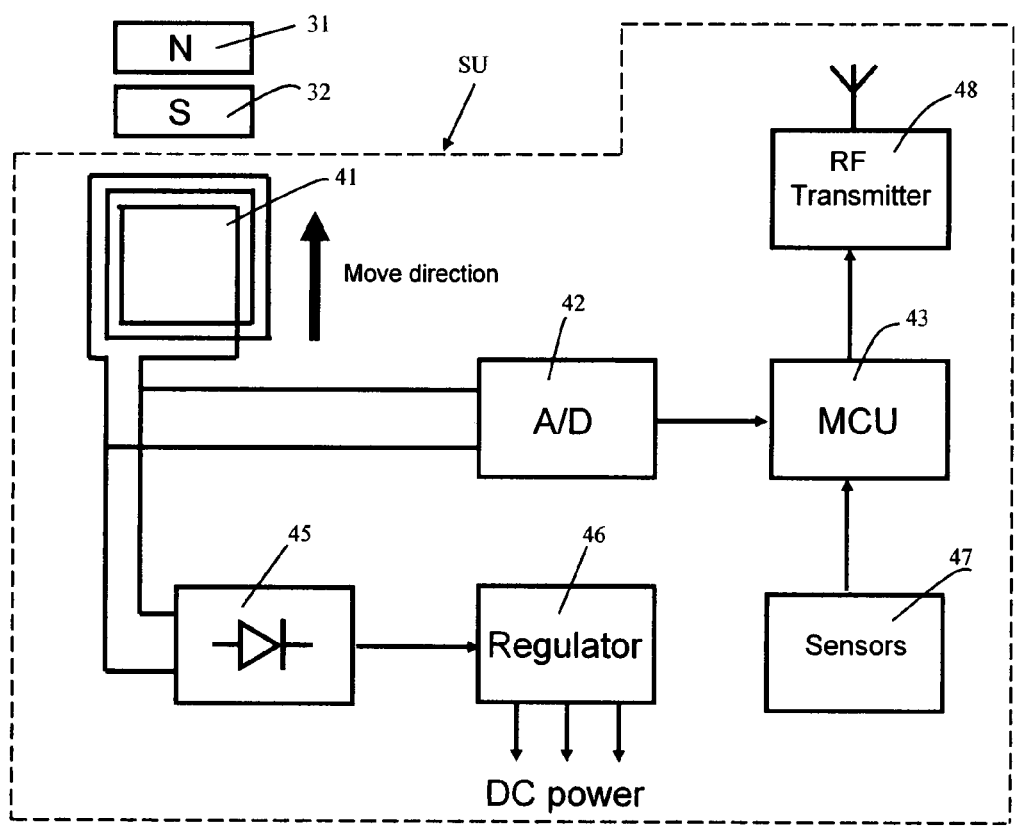
FIG. 6 is a schematic block diagram of a preferred embodiment of a sensor unit.

FIG. 6 is a schematic block diagram of a preferred embodiment of a sensor unit SU. As seen in this Fig., a magnetic field sensing element 41, illustrated as a multi-turn coil, is ohmically connected to two different circuit paths. The upper path comprises an analog-to-digital converter 42 having a pair of input terminals to which the output of magnetic field sensing element 41 is connected. The output of analog-to-digital converter 42 is connected to an input of a microcomputer unit 43. The lower path comprises a rectifier circuit 45 having a pair of input terminals to which the output of magnetic field sensing element 41 is connected. The output of rectifier circuit 45 is connected to a D.C. power regulator circuit 46. Elements 45, 46 function to develop D.C. power from the electrical current developed in coil 41 from passing through the magnetic field produced by magnets 31, 32 once per revolution of the associated tire. This process is more fully described in the aforementioned '278 application.

One or more tire parameter sensors 47 supply tire parameter electrical signals representative of the value of the sensor measurement(s) to the microcomputer unit 43. Microcomputer unit 43 combines these signals with the digital version of the magnetic field sensing element 41 signals and supplies these to an r.f. generator 48. R.f. generator 48 converts the received signals and transmits the converted signals to central receiver processor 25, in which the received signals are processed and used to drive display/alarm unit 26. Since the received signals contain the magnetic field identification signals, the accompanying tire parameter measurement signals are correlated to the magnetic field identification signals. The microcomputer unit 43 and r.f. generator 48 are preferably combined in a commercially available Freescale type MC68HC908RF2 unit or the equivalent, having a transmitter section for generating r.f. information signals containing tire parameter measurement results and magnetic field sensing element signals, and a microcomputer for supervising and controlling the operation of the transmitter section and for sensing the analog-to-digital converter 42 signals and the sensor output signals and converting these sampled signals to measurement data to be supplied to the transmitter section.

Figure 7:
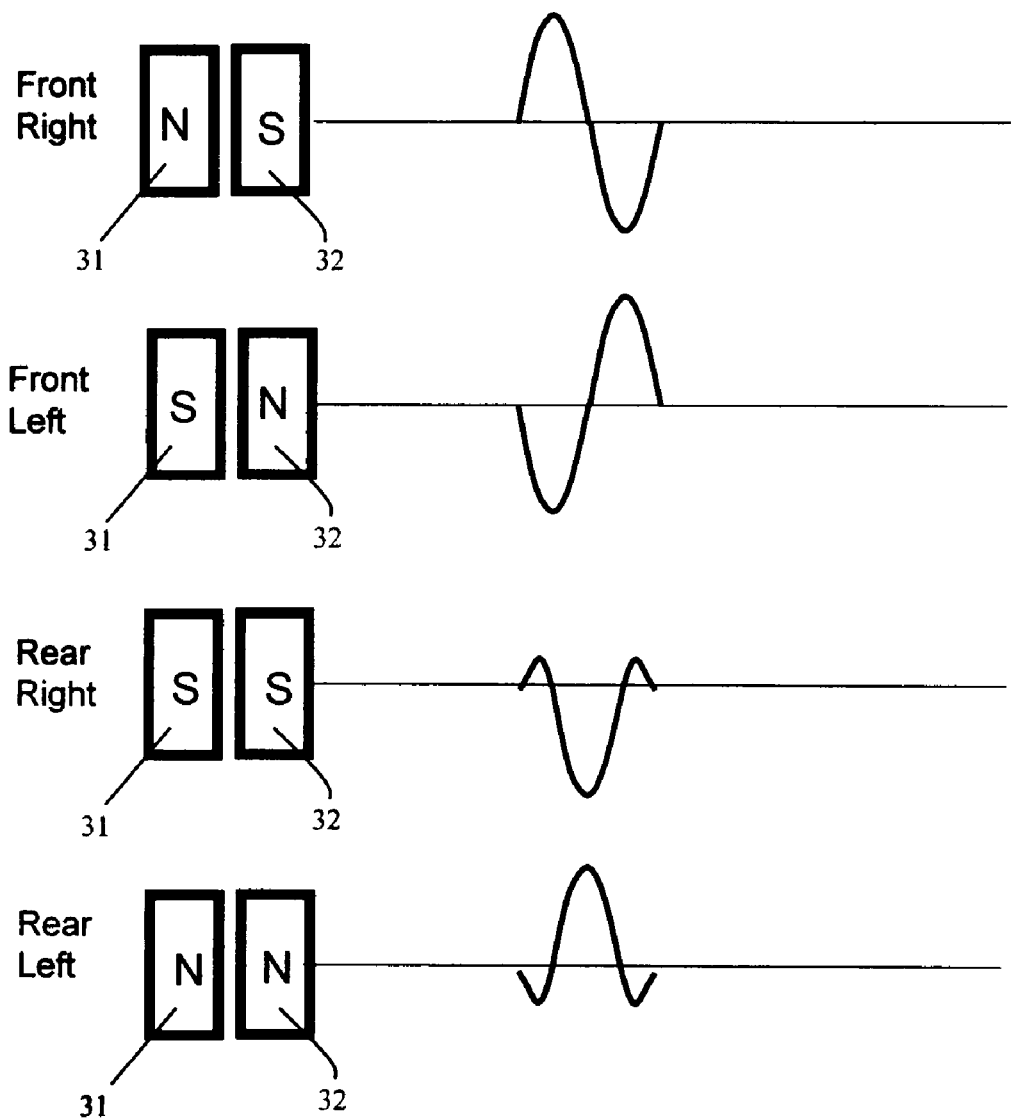
FIG. 7 is a compound diagram illustrating four different, unique magnetic polarity orientations and the corresponding associated electric waveforms.

FIG. 7 is a compound diagram illustrating four different, unique magnetic polarity orientations and the corresponding associated electric waveforms which uniquely identify the location of a given sensor unit 12, 14, 16, 18. As seen in this Fig., magnets 31, 32 can be arranged in four different and unique magnetic polarity orientations: NS, SN, SS, and NN. In this Fig., the legend N signifies that the north pole of the magnetic field generated by a magnet faces the viewer and the south pole is located at the hidden reverse surface of the magnet; while the legend S signifies that the south pole of the magnetic field generated by a magnet faces the viewer and the north pole is located at the hidden reverse surface of the magnet. When magnetic field sensing element 41 passes through the compound magnetic field produced by a given combination of magnets 31, 32, the resulting induced analog electrical signal has a unique shape as illustrated for the four different magnetic orientations. Each unique shape is permanently assigned to a tire location on the vehicle. In the example illustrated in FIG. 7, the uppermost signal shape is assigned to the front right tire location; the next signal shape is assigned to the front left tire location; the next signal shape is assigned to the rear right tire location; and the lowermost signal shape is assigned to the rear left tire location. As will be appreciated by those skilled in the art, the signal shape assignments are arbitrary: what is necessary is that the signal shape assignments be unique, invariant and programmed into the central receiver/processor 25. In this way, any tire parameter measurement signals received by the central receiver/processor 25 can be correlated to the transmitting location by the accompanying magnetic field sensing element signals.

When installing a system according to the invention at the vehicle factory, the usual quality control procedures can readily assure that the orientation of magnets 31, 32 conforms to the signal shape assignments for the fire locations, which are programmed into the central receiver/processor 25. Similarly, when installing a system according to the invention as an aftermarket item, care need only be taken that the orientation of magnets 31, 32 conforms to the signal shape assignments for the tire locations. Once installed, re-location of tires does not affect the accuracy and reliability of the system since the location of the sensor units is irrelevant to the identification of the location of the transmitting sensor unit. Thus, a spare tire can be exchanged for a tire on the vehicle without affecting the operation of the system.

Figure 8:
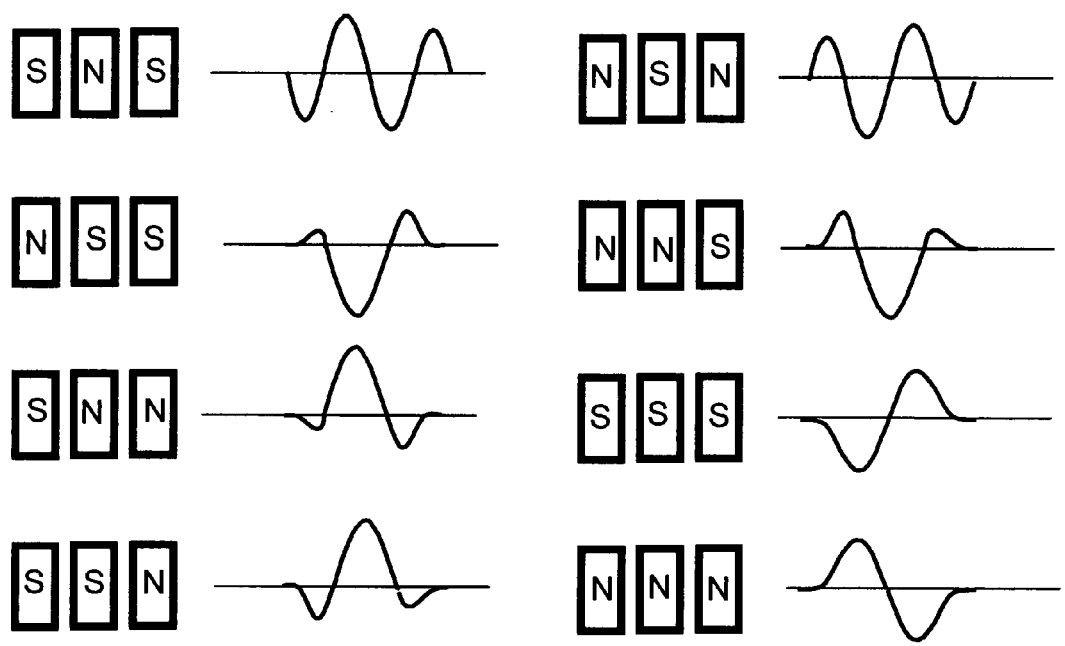
FIG. 8 is a compound diagram illustrating a plurality of unique magnetic polarity orientations using three magnets and the corresponding eight associated electric waveforms.

While the preferred embodiment has been described with reference to vehicles having four running tires, the invention is not so limited. For vehicles having more than four running tires, additional magnets can be added at each location and the signal shape assignments can be altered accordingly to accommodate analog signals having three or more components. FIG. 8 illustrates a three magnet arrangement which can uniquely identify up to 8 individual tires. In general, for N magnets, the number of individual tires which can be uniquely identified is 2 exp N.

Further, although the sensor unit has been described above as including an inductive D.C. power generating section comprising rectifier circuit 45 and D.C. power regulation unit 46, if desired this section may be omitted and some other D.C. power source—such as a battery—may be included. In such a configuration, the location signals and the sensor signals are processed in the same way as in the sensor unit described above.

As will now be apparent, the invention provides a tire parameter sensing system incorporating a sensor unit location feature which is simple and inexpensive to implement, highly reliable, and accurate. Installation of systems according to the invention can be readily done at the vehicle factory as an integral part of the manufacturing operation, or by aftermarket installers to retro-fit existing vehicles with the latest tire parameter monitoring technology. Once installed, tires can be re-located to other arbitrary locations without affecting the accuracy and reliability of the location information.

While the invention has been described with reference to particular preferred embodiments, various modifications, alternate embodiments, and equivalents may be employed, as desired. For example, other magnetic sensing elements, such as Hall effect sensors or MR sensors, may be employed in place of the simple multi-turn coil element, as desired. Therefore, the above should not be construed as limiting the invention, which is defined by the appended claims.

What is claimed is:

1. A tire position location system for use with a tire parameter monitoring system having at least one tire parameter sensor for monitoring a parameter of an associated tire rotatable mounted on a vehicle, said tire position location system comprising a sensor unit and a magnetic field generator, said sensor unit comprising:
a magnetic sensing element for generating location signals from magnetic fields encountered by the magnetic sensing element as the associated tire rotates;
a microcontroller coupled to the magnetic sensing element for receiving and processing the location signals and tire parameter signals from an associated tire parameter sensor; and
a signal generator controlled by the microcontroller for transmitting the processed location signals and the tire parameter signals to a receiving location;
said magnetic field generator comprising;
a set of magnets for generating a magnetic field unique to the location on the vehicle of the sensor unit, said set of magnets being fixed to the vehicle in a non-rotatable manner and located in proximity to the sensor unit at a location at which the magnetic field generated thereby is encountered by the magnetic sensing element as the tire rotates to cause said location signals to be generated.

2. The sensor unit of claim 1 wherein said magnetic sensing element comprises an inductive coil.

3. The sensor unit of claim 1 further including an analog-to-digital converter having an input coupled to said magnetic sensing element and an output coupled to said microcontroller.

4. The sensor unit of claim 1 further including a tire parameter sensor having an output coupled to said microcontroller.

5. The sensor unit of claim 1 further including a plurality of tire parameter sensors each having an output coupled to said microcontroller for supplying a plurality of tire parameter signals to said microcontroller.

6. A tire parameter monitoring system for monitoring the current values of tire parameters of tires mounted on a vehicle, said system comprising:
a plurality of sensor units each associated to a different tire on the vehicle, each sensor unit including a magnetic sensing element for generating location signals from magnetic fields encountered by the magnetic sensing element as the associated tire is rotated; a microcontroller coupled to the magnetic sensing element for receiving and processing the location signals and tire parameter signals from an associated tire parameter sensor; and a signal generator controlled by the microcontroller for transmitting the processed location signals and the tire parameter signals to a receiving location; and a plurality of sets of magnets for generating a plurality of different magnetic fields, each set of magnets being fixed to the vehicle in a non-rotatable manner and located in proximity to a different one of said plurality of sensor units in a location at which the magnetic field generated thereby is encountered by the magnetic sensing element of the corresponding sensor unit as the associated tire rotates.

7. The system of claim 6 wherein each said magnetic sensing element comprises an inductive coil.

8. The system of claim 6 wherein each said sensor unit further includes an analog-to-digital converter having an input coupled to said magnetic sensing element and an output coupled to said microcontroller.

9. The system of claim 6 wherein each said sensor unit further includes a tire parameter sensor having an output coupled to said microcontroller.

10. The system of claim 6 wherein at least one of said sensor units further includes a plurality of tire parameter sensors each having an output coupled to said microcontroller.

11. The system of claim 6 further including a receiver processor for receiving and processing the location signals and tire parameter signals from said sensor units.

12. A method of correlating tire parameter signals generated by sensor units each mounted for rotation with a different ones of a plurality of tires on a vehicle with the location of tires whose parameters are monitored by the sensor units, said method comprising the steps of:

i. generating a plurality of different magnetic fields in proximity to the sensor units using a plurality of sets of magnets each fixed to the vehicle in non-rotatable manner in proximity to a different tire, each different magnetic field being associated to a different tire location on the vehicle;

ii. converting each different magnetic field to an electric sensor unit location signal by moving a magnetic sensing element located on a given sensor unit through the proximate magnetic field;

iii. combining each electric sensor unit location signal with the tire parameter signals from the sensor unit at the location specified by the electric sensor unit location signal, and iv. transmitting the signals combined in step (c) to a receiving location.

13. The method of claim 12 wherein each said electric sensor unit location signal is an analog signal; and wherein said step (b) of converting includes the step of converting the analog signal to a digital signal.

14. The method of claim 12 further including the step (e) of processing the signals transmitted in step (d) at the receiving location.

15. The method of claim 14 wherein said step (e) of processing includes the step of generating a driver advisory signal for a given tire parameter.

* * * * *